United States Patent [19]
Rich, III et al.

[11] Patent Number: 5,945,941
[45] Date of Patent: Aug. 31, 1999

[54] PULSED RADAR APPARATUS AND METHOD EMPLOYING POWER DISTRIBUTION SYSTEM HAVING REDUCED COST AND WEIGHT AND ENHANCED EFFICIENCY AND RELIABILITY

[75] Inventors: Edward L. Rich, III, Arnold; Albert G. Tarrillo, Silver Spring, both of Md.

[73] Assignee: Northrop Grumman Corporation, Los Angeles, Calif.

[21] Appl. No.: 09/041,214

[22] Filed: Mar. 12, 1998

[51] Int. Cl.[6] ............................................. G01S 7/282
[52] U.S. Cl. ........................... 342/157; 342/158; 342/175; 342/201; 342/202; 342/204; 330/297; 332/112
[58] Field of Search ........................................ 342/157, 158, 342/175, 201, 202, 204; 330/297; 332/112

[56] References Cited

U.S. PATENT DOCUMENTS

| | | | |
|---|---|---|---|
| 4,268,828 | 5/1981 | Cribbs et al. | 342/26 |
| 4,827,267 | 5/1989 | Shearin | 342/201 |
| 4,980,810 | 12/1990 | McClanahan et al. | 363/16 |
| 5,136,300 | 8/1992 | Clarke et al. | 342/175 |
| 5,410,276 | 4/1995 | Hwang et al. | 330/297 |

*Primary Examiner*—John B. Sotomayor
*Attorney, Agent, or Firm*—Terry J. Anderson; Karl J. Hoch, Jr.

[57] ABSTRACT

A power distribution system (12) is provided in radar apparatus to distribute power from a 270 VDC source (60) through an intermediate power converter (70) and very high frequency (VHF) regulator/modulator units (80). Bus conductors (71,74) interconnect the source, the intermediate power converter, and the VHF units. Capacitors (71, 76) are connected to the bus conductors on the input and output sides of the intermediate power converter. Each VHF unit supplies modulating pulses to RF amplifiers (82) of an AESA array of the radar apparatus.

11 Claims, 4 Drawing Sheets

PULSED RADAR APPARATUS AND METHOD EMPLOYING POWER DISTRIBUTION SYSTEM HAVING REDUCED COST AND WEIGHT AND ENHANCED EFFICIENCY AND RELIABILITY

BACKGROUND OF THE INVENTION

The present invention relates to pulsed radar apparatus and methods, and, more particularly, to power distribution systems employed in such apparatus.

In state-of-the-art, ground-based or airborne pulsed radar apparatus, active electronically scanned arrays (AESAs) generate radar beams which have a digitally controlled magnitude and direction. AESAs are fixed in position and thus generate radar beams without need for array motion when a change is to be made in beam direction.

AESAs have numerous, small-beam generating units (such as gallium arsenide RF amplifiers) which are individually controlled in phase and magnitude to produce a collective radar beam having a specified direction and magnitude. A modulating power distribution system applies modulating power pulses to the individual units to provide the radar beam energy and to pulsate the collective radar beam at a specified radio frequency.

The system generates the modulating pulses up to a radio frequency, with each modulating pulse having a fast rise time and a fast fall time. Flat top portions of successive pulses are required to contain no more than an extremely small ripple.

A DC generator normally operates as a voltage source for the power distribution system and a digital system provides logic and other system functions in the radar apparatus. Conventionally, a dissipative DC-DC low voltage converter is used to reduce the source voltage, such as 270 volts, to a lower DC voltage, such as 10 volts, which is applied to a dissipative, linear regulator/modulator. In turn, the regulator/modulator generates the modulating power pulses which are output to one or more associated AESA RF amplifier units. The digital system generates logic signals to control the modulating frequency of the modulating power pulses generated by the converter and applied to the AESA.

Capacitor and filter elements are disposed in the power distribution system to provide energy storage which reduces peak demand on the voltage source.

A bus system is employed to interconnect the described power distribution system components. Numerous bus connections are required at a lower level of the power distribution system because of the large number of AESA RF amplifiers.

At higher system levels, buses can be quite large and weighty because of the current amplitudes needed to supply a large number of AESA RF amplifiers. In airborne radar apparatus, bus weight can be significant even where the low voltage DC source is within 2 or 3 meters of the AESA circuitry. Bus system weight can be controlled through architectural and mechanical design, but only to an extent limited by the overall design of the power distribution system.

In addition to being undesirably heavy, conventional power distribution systems operate with undesirably low efficiency. Typically, a power distribution system, of the type considered above, operates with an efficiency of 65% or less. In another known power distribution system design called a distributed power supply configuration, many small, low voltage power supplies are distributed over the AESA to save bus weight, but overall power distribution system efficiency is restricted by the use of linear regulator/modulators and is thus little better at about 67%.

Some effort has been made in the prior art to improve the efficiency, weight, and other characteristics of distributed power supply systems. For example, U.S. Pat. No. 5,410,276, entitled RF MODULATION USING A PULSED DC POWER SUPPLY and issued to William B. Hwang et al. on Apr. 25, 1995, discloses a system in which a very high frequency (VHF) converter is employed in the generation of modulating power pulses for an AESA.

However, the Hwang patent restrictively applies a VHF converter in an AESA power distribution system only to eliminate the conventional use of a linear regulator/modulator, enable direct modulation of the high power RF amplifier circuitry, and, as restrictively applied, enable only improvements in the AESA operating circuitry coupled between the VHF converter and the AESA. For example, Hwang cites reduced downstream energy storage capacitance located on the AESA, reduced size through elimination of conventional modulation circuitry for the RF amplifiers, etc. In an earlier U.S. Pat. No. 4,980,810, entitled VHF DC-DC POWER SUPPLY OPERATING AT FREQUENCIES GREATER THAN 50 MHZ and issued to R. F. McClanahan et al. on Dec. 20, 1990, the disclosure is limited to VHF converter circuitry.

A need thus exists to improve pulsed radar apparatus such that power distribution is provided for AESA radar pulse modulation with significantly greater efficiency and reduced weight for the power distribution system as a whole as opposed to just a portion of it. It is further desirable that such power distribution be provided with greater whole system reliability and lower, whole system cost.

SUMMARY OF THE INVENTION

A pulsed radar system comprises an active electronic scanning array, having a plurality of radio frequency (RF) amplifiers and a digital system for controlling the array to generate output radar pulses. A DC power supply generates a high DC voltage for energizing the digital system and the array. A power distribution system generates DC modulation pulses for gating the radio frequency amplifiers, and includes an intermediate power converter unit which outputs an intermediate DC voltage below the high DC voltage and which is structured to operate as a current source with current limiting control within a defined voltage range.

First bus means connects the power supply and the intermediate power converter unit, and first capacitor means is connected to the first bus means to provide energy storage for the power distribution system.

A plurality of very high frequency (VHF) regulator/modulator units convert the intermediate DC voltage to reduced voltage, output DC pulses having ultra-low ripple and otherwise being formed to operate effectively as modulating pulses for the RF amplifiers. Second bus means connects the intermediate power converter unit and the VHF regulator/modulator units, and second capacitor means is connected to the second bus means to provide energy storage for the power distribution system. Each VHF regulator/modulator unit is connected to transmit modulating pulses to each of a plurality of the RF amplifiers thereby enabling operation of the array, and means are provided for controlling the rate at which the modulating pulses are generated.

BRIEF DESCRIPTION OF THE DRAWINGS

The accompanying drawings, which are incorporated in and constitute a part of this specification, illustrate a pre

DESCRIPTION OF THE INVENTION

The invention provides a power distribution system for an AESA with significantly improved whole system efficiency, i.e., conversion efficiency is improved by at least 30% and power system dissipation is reduced by at least 65% to produce an overall efficiency of 84% or better. The system of the invention employs dynamic energy storage to reduce the weight of power distribution system capacitors by a factor of seven and the weight of the low voltages distribution bus by a factor of 16. Simultaneously, system reliability and maintainability are increased and power system cost is reduced.

Figure 1:
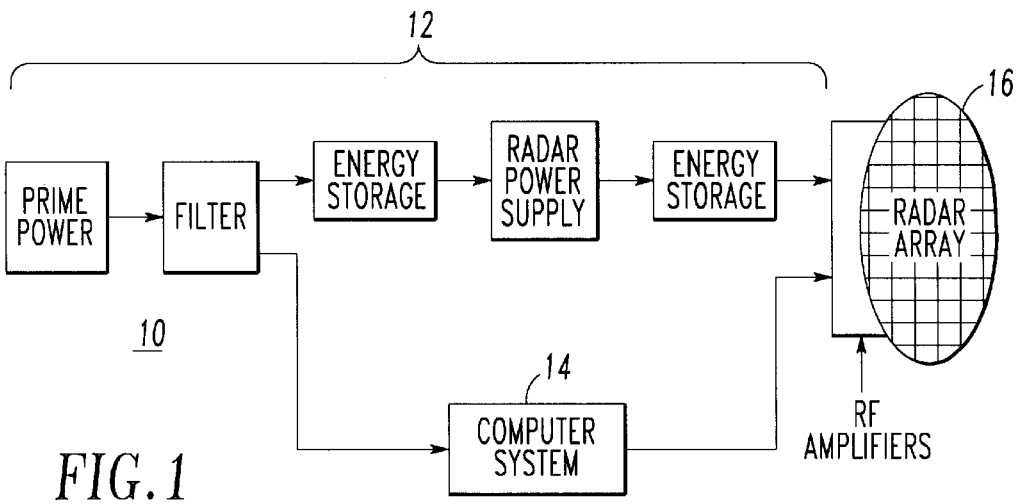
- FIG. 1 illustrates a system block diagram for pulsed radar apparatus arranged in accordance with the invention.

A pulsed radar system 10 employing a power distribution system 12 of the invention is illustrated by a block diagram in FIG. 1. As shown, the power distribution system supplies operating power to elements of the radar system including a radar digital or computer system 14, and further supplies power for modulation of RF amplifiers associated with an antenna array or AESA 16.

As previously indicated, state-of-the-art architectures for the most widely used AESA power distribution systems are undesirably large and heavy as a result of employing low voltage converters (such as 10 to 12 volt units) and dissipative linear regulator/modulators. The typical overall system efficiency of prior-art systems is 65% or less. The above referenced Hwang patent provides only some limited improvement as previously noted.

Figure 4:
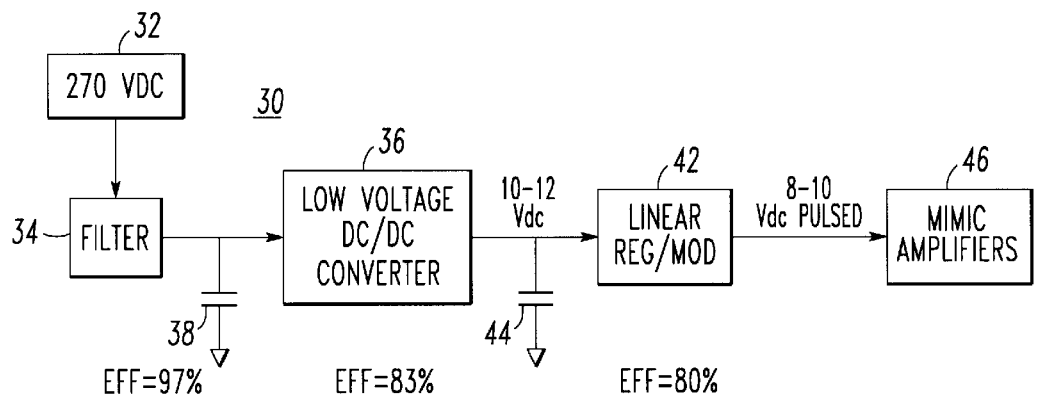
FIGS. 4 and 5 illustrate alternative prior art configurations for distributing power which is to be used to modulate AESA RF amplifier pulses.

More particularly, a prior-art AESA power distribution system 30 is shown in FIG. 4. A prime power unit 32 feeds energy to an input filter and conditioner 34, at a high voltage such as 270 V DC. The filter output is applied to a low voltage DC-DC converter 36, or multiple parallel connected converters (not shown), with an energy storage capacitor unit or bank 38 connected therebetween and to a return path 40. The typical efficiency of this input circuitry is 97%.

The converter(s) 36 typically produce converted power at 10 to 12 VDC. The converter output(s) is (are) applied to one or more linear regulator/modulators 42 with another energy storage capacitor unit or bank 44 connected therebetween and to the return path 40. The regulator/modulator outputs are applied to multiple RF (MIMIC) amplifiers 46 which deliver amplified pulses at 10 to 12 VDC and at a controlled frequency to elements of an AESA.

The downconversion/energy-storage circuitry typically operates with an efficiency of 83%. The linear regulator/modulators 42 typically operate with a voltage drop of 1.5 to 2 volts as a function of load, and with an efficiency of 80%. The typical overall efficiency of the prior-art system 30 is the individual unit efficiencies multiplied together, or 65%, which is undesirably low.

Figure 5:
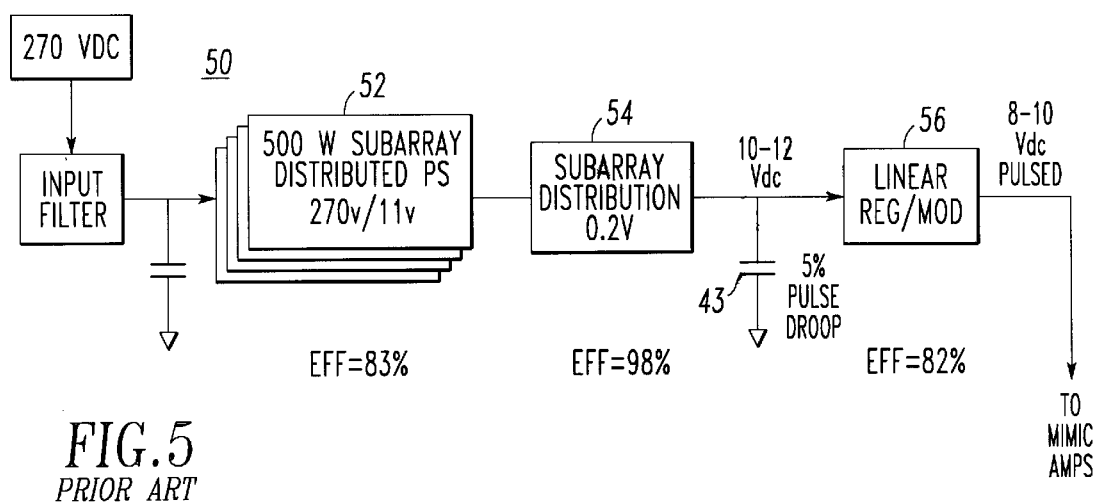

Another prior-art AESA power distribution system 50 is shown in FIG. 5. The system 50 is referred to as a distributed supply system. Thus, the system 50 is similar to the system 30, but voltage downconversion is performed by distributed units 52 at a typical efficiency of 83%. A subarray distribution network 54 operates with a voltage drop of 0.2 volts at a typical efficiency of 98%. Output linear regulator/modulators 56 are similar to the regulator/modulators 42 of FIG. 4, and operate with a typical efficiency of 82%. An energy storage capacitor 43 operates at an input of the modulators 56 with at most a 5% pulse droop as required by considerations of system structure and operation and AESA modulation performance requirements.

The prior-art system 50 uses multiple, small, low-voltage, distributed power supplies to save on bus weight. However, little improvement is achieved in overall efficiency, i.e., the unit efficiencies multiplied together provide an overall efficiency of 67%.

Figure 2B:
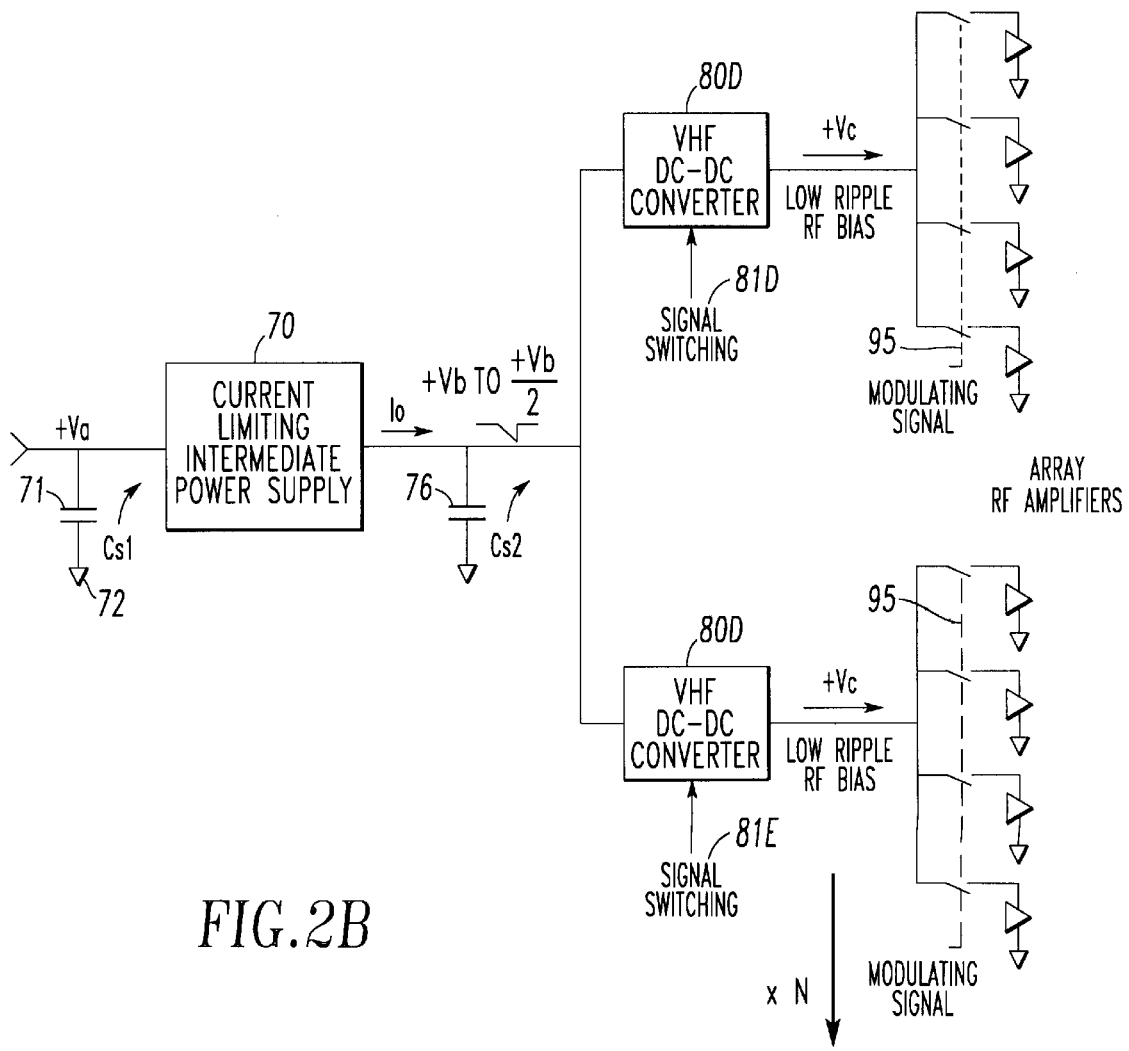
FIG. 2B is a block diagram representing another power distribution system arranged in accordance with the invention and employable in the apparatus of FIG. 1.
Figure 2A:
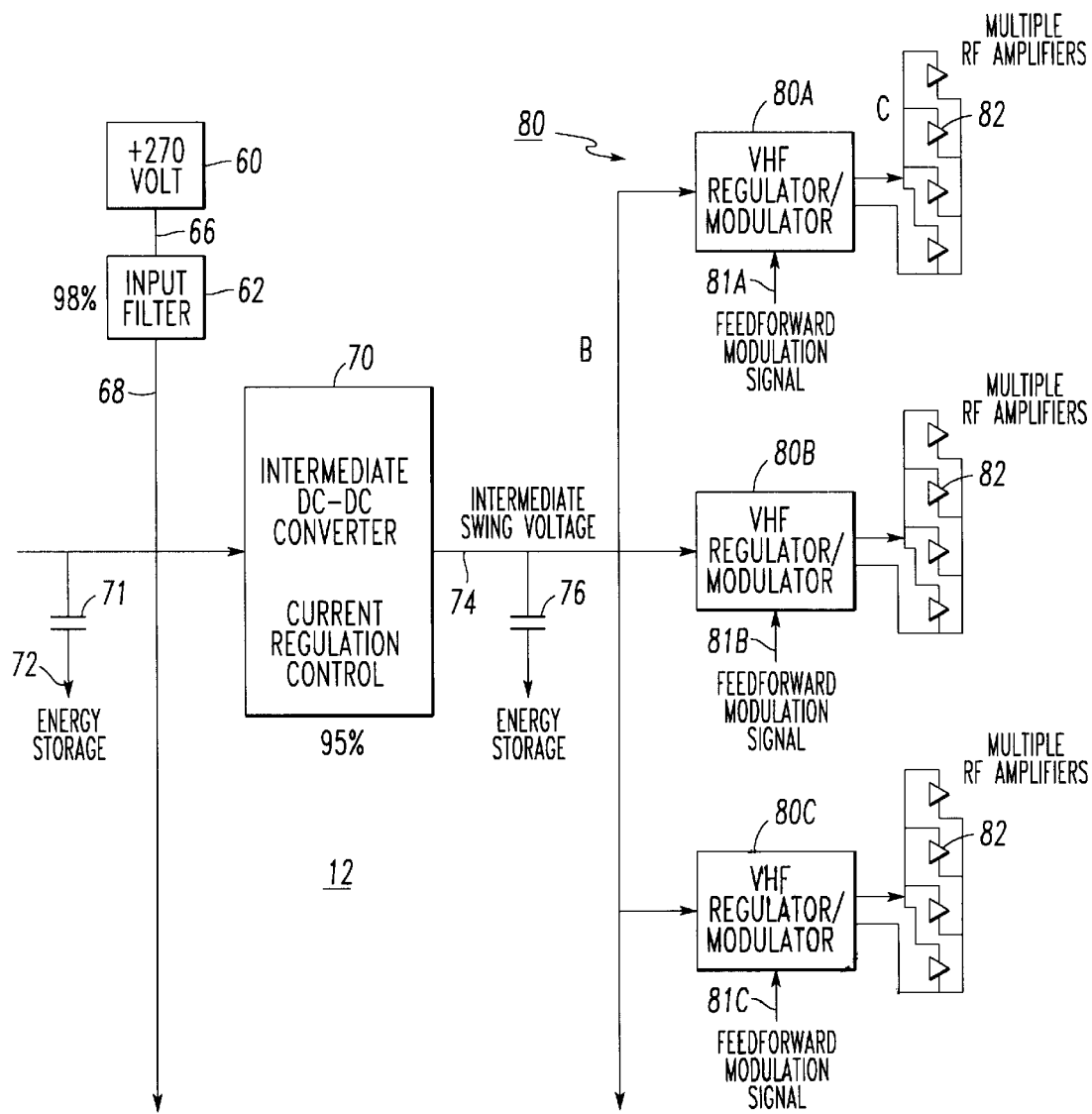
FIG. 2A shows a block diagram representing a power distribution system arranged in accordance with the invention and employable in the apparatus of FIG. 1.

A first embodiment of the power distribution system 12 of the invention is shown in FIG. 2A. A prime power supply 60 applies a voltage, such as +270 volts, to a filter and conditioning unit 62 through a bus 66.

The filter/conditioner unit 62 attenuates undesired frequencies generated by the power source 60, with surge current and voltage protection. The unit 62 is connected to another bus 68 which operates as a back plane power source for intermediate DC-DC converter(s) 70. A capacitor unit or capacitor bank 71 is connected from the bus 68 to a return path 72 to provide energy storage for the system 12.

The intermediate DC-DC converter(s) 70 generates voltage over a predetermined range, such as 30 to 60 VDC, and is provided with a current control loop to operate as a current source, rather than a voltage source, so that current remains constant as voltage droops from an upper limit under load conditions. The intermediate converter 70 feeds energy over intermediate bus 74 to a capacitor unit or bank 76 with less bus conductor volume than that required for a conventional 5% voltage droop implementation, such as the prior art system of FIG. 5. The intermediate converter 70 operates with an efficiency as high as 95%.

Since the intermediate DC-DC converter 70 operates with a voltage swing (45% in this case), the capacitance of the energy storage unit 71 can be reduced by a factor of seven as compared to the prior art. In applying the invention, increased capacitor voltage droop enables reduced capacitance and, in turn, reduced system volume and weight.

Further, increasing (in this case, quadrupling) the operating voltage of the intermediate bus 74, as compared to the prior art, enables the resistance of the intermediate bus 74 to be increased (by sixteen times, in this case). Since the weight of conductor varies as the reciprocal of its resistance, the weight of the intermediate bus 74 can be reduced as compared to comparable bus structure in the prior art, i.e., at a given power transmission, the weight of the intermediate bus 74, operating at 45 VDC, can be one sixteenth the weight of a bus operating at 11 VDC.

In the system 12, the intermediate voltage bus 74 is connected in parallel to multiple, very-high-frequency (VHF) converter or regulator/modulator units 80, in this case three units 80A, 80B, and 80C. The VHF converter units 80 are gated on and off fast enough to provide direct modulation of microwave amplifiers 82, i.e., in the preferred embodiment, direct modulation of the drain voltage of gallium arsenide microwave amplifiers which pulse the AESA elements. Accordingly, the term "VHF converters", as used herein, is intended to mean a converter having sufficiently high switching rates to enable direct modulation of AESA RF amplifiers. The units 80 operate with an efficiency as high as 90%.

An array computer generates small, enable/shunt signals 81A, 81B, and 81C which are applied through a digital interface (not shown) to the VHF regulator/modulators 80. As shown, when enabled, each VHF modulator/regulator 80 supplies four RF amplifiers 82 in parallel, preferably with a signal of 8 to 10 DC volts. However, different voltage ranges will be desirable according to different RF semiconductor technologies. For example, pHEMT technology typically employs 7 to 9 volts, MESFET technology typically employs 8 to 10 volts, and cascode circuitry typically can employ up to 12 volts.

The VHF converters or regulator/modulator units 80 provide extended frequency operation to reduce passive filter capacitance and inductance values within the units by the inverse of the frequency 1/f, as compared to prior art linear regulator/modulators. The VHF units 80 have resonant properties which result in pulse output performance characterized with low ripple and noise.

The frequency of the ripple is well above normal radar pulse repetition frequencies and sampling frequencies. In addition, a second stage of filtering can be used, and preferably is used, in the VHF converters 80 so that pulse ripple is reduced to a low microvolt level where it is reasonably characterized as noninterferrng in the radar system.

Further, the VHF converter units 80 have a very short turn on-time, fast transient response, and small filter time constants which enable direct modulation of the RF amplifiers 82.

In FIG. 2B, another embodiment of the invention is illustrated. In this case, elements like those described for the embodiment of FIG. 2A are employed to a great extent. However, the VHF converters are held in an enabled state when the array computer generates an enable signal, and electronic switch structure 95 is included in the input voltage line for the RF amplifiers 82. The switch structure 95 is preferably embodied in the form of one or more switching transistors. A control signal from the array computer thus controls the transistor switching rate to modulate the RF amplifiers with pulses derived from the continuously operating VHF converter 80.

Figure 3:
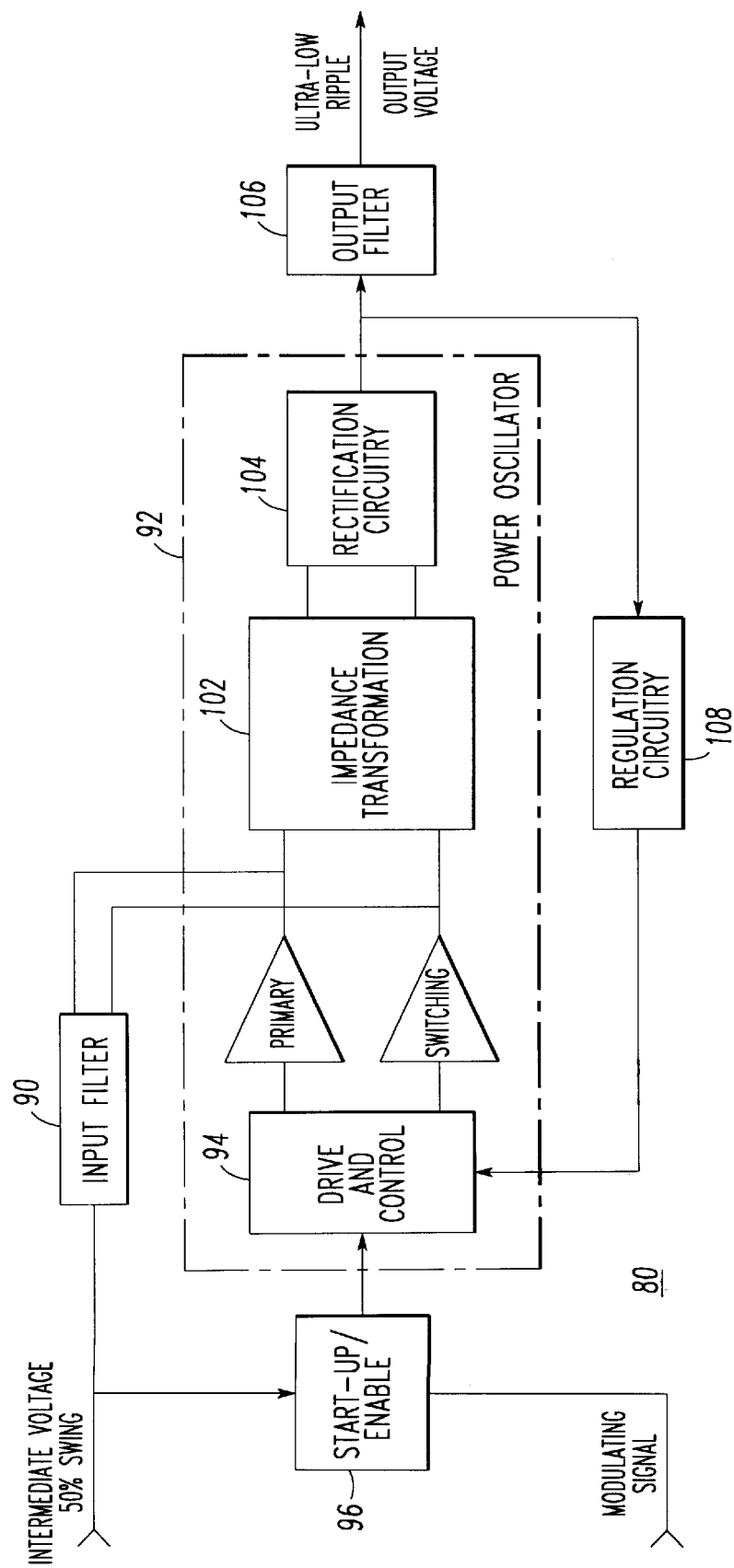
FIG. 3 shows a block diagram representing a VHF converter employed in the power distribution system of FIG. 2A or 2B.

The VHF converter 80 is shown in greater block detail in a block diagram in FIG. 3. The VHF converters 80 operate in the frequency range 30 MHZ to 300 MHz, thereby enabling the described direct RF modulation. In contrast, high frequency (HF) converters operate below 30 MHZ.

An input filter 90 receives the intermediate DC voltage which has a 50% swing, and attenuates any AC signals to block them from entry to a power oscillator 92. The filter output DC current is supplied to the power oscillator 92.

In the power oscillator 92, a drive and control circuit 94 is enabled by a startup/enable circuit indicated by block 96. Startup circuitry within the block 96 initially biases enable, regulation, and control circuitry in preparation of receiving an enable signal from the array computer. The enable signal turns the oscillator 92 and the VHF converter 80 on and off, and the enable signal on/off rate determines the converter output pulse repetition frequency (PRF), which may be the RF amplifier PRF.

The voltage amplitude of the converter output modulating pulses is predetermined by RF amplifier requirements which are reflected in the VHF converter design.

The drive and control circuit 94 is coupled to switching elements 98 and 100. These switches basically chop the input DC voltage to an AC signal for transforming to a desired level where rectification back to DC occurs. The switch outputs are thus connected to an impedance transformer 102 which preferably also provides DC isolation, and an alternating signal from the transformer 102 is connected to a rectifier 104.

A downconverted DC voltage is connected from the rectifier 104 to an output filter 106 which supplies converter output DC voltage pulses, with ultra-low ripple, as gating pulses for AESA RF amplifiers.

Feedback regulation circuitry 108 samples the output DC voltage to develop a corrective control signal which is applied to the drive and control circuit 94 to maintain the set amplitude for the converter DC voltage at the output of the output filter 104.

In regulating the converter operating frequency, the regulation circuit feeds a DC error signal to the control circuit to vary the operating frequency. The operating frequency for the VHF converter in the embodiments described herein is in the hundred MHZ range, as contrasted with radar frequencies which are in the Giga Hz range. The modulating pulse repetition rate (PRF), produced under array computer control, would usually be in the hundred Hz or kiloHz range.

For more information on VHF converters, reference is made to 1215–328 which is hereby incorporated by reference.

Overall, the invention provides significant system improvements for AESA power distribution systems. These include the described benefits of VHF regulator/modulator operation, higher efficiency stemming from DC-DC voltage conversion (84% versus 65–67% in the prior art) to an intermediate voltage value (270 VDC to 50 VDC, in this case), lower losses at the operating intermediate voltage level, and improved energy use in pulse storage capacitors as a result of increased voltage droop, i.e., 5% (DELTA Q=0.1) to 45% (DELTA Q1=0.7) in the preferred embodiment.

The foregoing description of the preferred embodiment has been presented to illustrate the invention without intent to be exhaustive or to limit the invention to the form disclosed, In applying the invention, modifications and variations can be made by those skilled in the pertaining art without departing from the scope and spirit of the invention. It is intended that the scope of the invention be defined by the claims appended hereto, and their equivalents.

What is claimed is:

1. A pulsed radar system comprising:

an active electronic scanning array having a plurality of radio frequency (RF) amplifiers;

a digital system for controlling the array to generate output radar pulses;

a DC power supply generating a high DC voltage for energizing the digital system and the array;

a power distribution system for generating DC modulation pulses for gating the radio frequency amplifiers;

the power distribution system having an intermediate power converter unit which outputs an intermediate DC voltage below the high DC voltage and which is structured to operate as a current source with current limiting control within a defined voltage range;

first bus means connecting the power supply and the intermediate power converter unit;

first capacitor means connected to the first bus means to provide energy storage for the power distribution system;

a plurality of very high frequency (VHF) regulator/modulator units for converting the intermediate DC voltage to output, reduced voltage DC pulses having ultra-low ripple and otherwise being formed to operate effectively as modulating pulses for the RF amplifiers;

second bus means connecting the intermediate power converter unit and the VHF regulator/modulator units;

second capacitor means connected to the second bus means to provide energy storage for the power distribution system;

each VHF regulator/modulator unit being connected to transmit modulating pulses to each of a plurality of the RF amplifiers thereby enabling operation of the array; and means for controlling the rate at which the modulating pulses are generated.

2. The system of claim 1 wherein the controlling means includes the digital system.

3. The system of claim 1 wherein the controlling means switches the VHF regulator/modulator units on and off at a rate which defines the modulating pulse repetition rate.

4. The system of claim 1 wherein the high DC voltage is approximately 270 volts, the intermediate DC voltage is within an approximate range of 30 volts to 60 volts, and the modulating pulses have a DC voltage in the approximate range of 7 volts to 12 volts.

5. The system of claim 1 wherein:

the VHF regulator/modulators are on continuously during system operation; and the controlling means includes electronic switching means which is connected to gate circuitry of the RF amplifiers and operated to control the modulating pulse generation rate.

6. A power distribution system for an active electronic scanning array in a pulsed radar apparatus, the system comprising:

an intermediate power converter unit which outputs an intermediate DC voltage below a high DC voltage of an apparatus power supply and which is structured to operate as a current source with current limiting control within a defined voltage range;

first bus means for connecting the intermediate power converter unit to the apparatus power supply;

first capacitor means connected to the first bus means to provide energy storage for the power distribution system;

a plurality of very high frequency (VHF) regulator/modulator units for converting the intermediate DC voltage to reduced-voltage, output DC pulses having ultra-low ripple and otherwise being formed to operate effectively as modulating pulses for RF amplifiers of the array;

second bus means connecting the intermediate power converter unit and the VHF regulator/modulator units;

second capacitor means connected to the second bus means to provide energy storage for the power distribution system;

each VHF regulator/modulator unit being connected to transmit modulating pulses to each of a plurality of the RF amplifiers to enable operation of the array; and means for controlling the rate at which the modulating pulses are generated.

7. The system of claim 6 wherein the controlling means switches the VHF regulator/modulator units on and off at a rate which defines the modulating pulse generation rate.

8. The system of claim 6 wherein:

the VHF regulator/modulators are on continuously during system operation; and the controlling means includes electronic switching means which is connected to drain circuitry of the RF amplifiers and operated to control the modulating pulse generation rate.

9. The system of claim 6 wherein, during modulation pulse generation, voltage droop on the second bus means is greater than 5% up to approximately 45%.

10. The system of claim 9 wherein the high DC voltage is approximately 270 volts, the intermediate DC voltage is within an approximate range of 30 volts to 60 volts, and the modulating pulses have a DC voltage in the approximate range of 7 volts to 12 volts.

11. A method for operating a pulsed radar apparatus, the method steps comprising:

controlling an active electronic scanning array to generate output radar pulses;

generating power at a high DC voltage to energize the radar apparatus;

distributing power to an intermediate power converter unit through a bus means which generates an intermediate DC voltage below the high DC voltage while operating as a current source with current limiting control within a defined voltage range;

storing energy from the first bus means for return to the first bus means as needed;

operating a plurality of very high frequency (VHF) regulator/modulator units, connected to the intermediate power converter through a second bus means, to convert the intermediate DC voltage to reduced-voltage, output DC pulses having ultra-low ripple and otherwise being formed to operate effectively as modulating pulses for RF amplifiers associated with the array;

storing energy from the second bus means for return to the second bus means as needed; and controlling the rate at which the modulating pulses are generated.

* * * * *